United States Patent [19]
Brown et al.

[11] Patent Number: 5,816,712
[45] Date of Patent: Oct. 6, 1998

[54] ELASTOMERIC CARTRIDGES FOR ATTENUATION OF BEARING-GENERATED VIBRATION IN ELECTRIC MOTORS

[75] Inventors: Robert G. Brown, New Bern, N.C.; Jeffrey A. Wong, Stevensville, Md.; Usman A. K. Sorathia; Ivan L. Caplan, both of Arnold, Md.

[73] Assignee: The United States of America as represented by the Secretary of the Navy, Washington, D.C.

[21] Appl. No.: 800,417

[22] Filed: Feb. 14, 1997

[51] Int. Cl.⁶ ..................................................... F16C 35/06
[52] U.S. Cl. ............................................ 384/536; 384/582
[58] Field of Search ................................... 384/535, 536, 384/581, 582

[56] References Cited

U.S. PATENT DOCUMENTS

| | | | |
|---|---|---|---|
| 2,674,505 | 4/1954 | Pfenninger, Jr. et al. | |
| 2,986,432 | 5/1961 | Schlauch | |
| 3,107,946 | 10/1963 | Drake | 384/536 X |
| 3,365,032 | 1/1968 | Gorndt | 188/86 |
| 3,709,570 | 1/1973 | Galbato | 384/536 |
| 4,228,881 | 10/1980 | Nakamura | 192/98 |
| 4,601,591 | 7/1986 | Wright | 384/536 |
| 4,921,229 | 5/1990 | Hori | 267/140.1 |
| 5,018,882 | 5/1991 | Shiratani et al. | 384/484 |
| 5,033,875 | 7/1991 | Moulinet | 384/536 |

FOREIGN PATENT DOCUMENTS

| | | | |
|---|---|---|---|
| 2819366 | 11/1979 | Germany | 384/582 |
| 525432 | 8/1940 | United Kingdom | 384/536 |

OTHER PUBLICATIONS

Marks' Standard Handbook for Mechanical Engineers, T. Baumeister ed. 8th ed, McGraw–Hill Book Co., New York, 1978, pp. 8–136 to 8–143.

Primary Examiner—Thomas R. Hannon
Attorney, Agent, or Firm—Howard Kaiser

[57] ABSTRACT

The inventive cylindrical cartridges are installed in machinery for purposes of isolating vibration of conventional rolling element bearings from major machinery components. Two inventive cartridges are concentrically coupled with a rolling element bearing, one cartridge fitting circumferentially inside the bearing's inner ring, the other cartridge fitting circumferentially outside the bearing's outer ring. Each inventive cartridge comprises inner and outer concentric cylindrical metallic pieces and an intermediate filling which includes two lateral circumferential elastomeric bands separated by a medial circumferential air gap. The inventive cartridges can be inexpensively fabricated and can be permanently integrated with existing machinery.

20 Claims, 1 Drawing Sheet

ELASTOMERIC CARTRIDGES FOR ATTENUATION OF BEARING-GENERATED VIBRATION IN ELECTRIC MOTORS

The invention described herein may be manufactured and used by or for the Government of the United States of America for governmental purposes without the payment of any royalties thereon or therefor.

BACKGROUND OF THE INVENTION

The present invention relates to bearings which implement rolling elements, more particularly to methods and apparatuses for reducing transmission of vibration from such bearings.

Roller (rolling-contact) bearings are conventionally used for locating and supporting machine parts such as rotors or rotating shafts. Typically, the rolling elements of a roller bearing are balls or rollers. In general, a roller bearing is a type of anti-friction bearing; a roller bearing serves to minimize friction so as to permit relatively free rotation. Also, a roller bearing generally acts to transfer loads between rotating and stationary members.

Many machinery applications require operation of auxiliary machine components at low vibration levels. A roller bearing which supports a shaft or rotor represents a source of vibration in rotating machinery such as electric motors and pumps. Conventional approaches to reducing bearing vibration on machines have involved expensive utilization of precision bearings or custom-made bearings.

SUMMARY OF THE INVENTION

In view of the foregoing, it is an object of the present invention to provide method and apparatus for effectively attenuating vibration generated by roller bearings in rotating machinery.

It is a further object of this invention to provide such method and apparatus which are practical, efficient and economical.

The present invention provides an improved roller bearing assembly. The roller bearing assembly is of the type wherein a plurality of rolling elements contact two coaxial rings, the inner ring being used for securing with respect to a rotating non-bearing object, the outer ring being used for securing with respect to a fixed non-bearing object.

The inventive improvement comprises at least one cylindrical cartridge which is coaxially positioned, radially interpositionally, between a ring and a non-bearing object. Each cylindrical cartridge comprises a radially inner circumferential layer, a radially outer circumferential layer and a core circumferential layer. The core circumferential layer includes two axially extreme elastomeric (e.g., rubber) sections which are separated by an axially intermediate gap.

According to some inventive embodiments the improvement further comprises at least one elastomeric (e.g., rubber) annular disk, i.e., a washer-like, o-ring-shaped member which is coaxially positioned, axially interpositionally, between a ring and a non-bearing object. Many such inventive embodiments additionally implement at least one non-elastomeric (e.g., metallic) annular backing plate, each of which is joined with an elastomeric annular disk. The non-elastomeric annular backing plate is flushly coupled with the elastomeric annular disk so as to facilitate installation and to amplify structural integrity once installed.

According to this invention, the non-elastomeric annular backing plates and the radially extreme cylindrical cartridge layers can each be made of either a metallic material or a nonmetallic material (e.g., a composite material), so long as the structural characteristics (e.g., in terms of strength and rigidity) are adequate. Furthermore, it may be appropriate in inventive practice that there be commonality of material composition for two or more members among the non-elastomeric annular backing plates and the radially extreme cylindrical cartridge layers. For example, it may be inventively suitable that the radially extreme layers for each cylindrical cartridge be made of the same metal material, or that the radially extreme layers for every cylindrical cartridge be made of the same metal material; or, it may be inventively convenient that the non-elastomeric annular backing plates be made of the same metal material of which the radially extreme cylindrical cartridge layers are made.

The invention uniquely features a tri-layered unitary cartridge configuration, and appropriate placement thereof, for attenuation of vibration generated by rolling element bearings. More specifically featured is the tri-columnar arrangement of the core layer. Each inventive cartridge affords damping, by the two lateral elastomeric portions of its core layer, and noise reduction, by the medial air gap portion of its core layer. Some inventive embodiments further feature implementation of one or more elastomeric annular disks, at the bearing-motor end cap interface and/or the bearing-locknut interface, for mitigating shorted vibration paths.

The inventive cartridges can be installed in machines such as electric motors and pumps for purposes of attenuating bearing-generated vibration. Overall, the inventive cartridge is at least to some extent successful in isolating vibration of the bearing from the solid members of the motor, i.e., vibration which is transmitted by the bearing via the shaft, axially and via the housing, radially.

Conventional approaches to bearing vibration attenuation are generally more costly than is the inventive approach. Moreover, conventional approaches do not provide for permanent installation of vibration attenuation apparatus which thus operate on an ongoing basis, as does the inventive approach.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein.

DETAILED DESCRIPTION OF THE INVENTION

Figure 1:
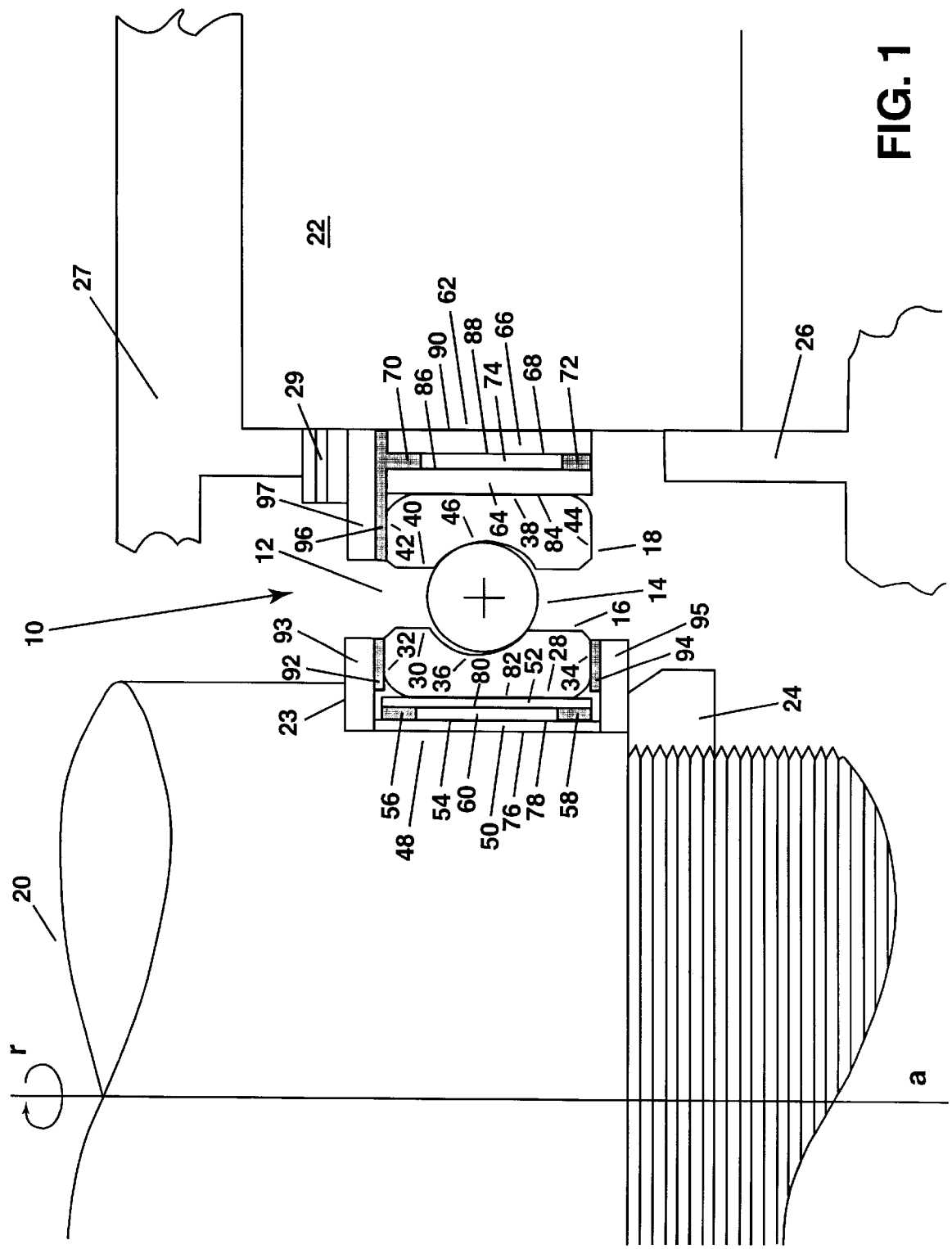
FIG. 1 is a diagrammatic partial cross-sectional view of an embodiment of an inventive roller bearing assembly which is being used for a rotating shaft in an electric motor.

Referring now to FIG. 1, inventive roller bearing assembly 10 includes standard roller bearing 12. Standard roller bearing 12 essentially consists of a plurality of rolling elements 14 in rolling contact with the corresponding raceway surfaces of inner bearing ring 16 and outer bearing ring 18.

Inner ring 16 is fixed with respect to rotating shaft 20, which rotates in direction r about axis a; outer ring 18 is fixed with respect to bearing housing 22, which for some applications could be envisioned as an alternative structure, e.g., a motor endbell. Bearing locknut 24 helps secure inner ring 16 with respect to rotating shaft 20. Bearing end caps 26 and 27 help secure outer ring 18 with respect to bearing housing 22.

Inner ring 16 has inner ring nonracewayed (bore) surface 28, inner ring racewayed surface 30 and inner ring side surfaces 32 and 34; inner ring racewayed surface 30 is provided with inner ring raceway 36. Outer ring 18 has outer ring nonracewayed surface 38, outer ring racewayed surface 40 and outer ring side surfaces 42 and 44; outer ring racewayed surface 40 is provided with outer ring raceway 46.

Inner cylindrical vibration attenuator cartridge 48 has two concentric/coaxial metallic rings, viz., inner cartridge inner metal ring 50 and inner cartridge outer metal ring 52, which sandwich an inner cartridge circumferentially tri-columnar layer configuration 54 having a pair of lateral high damping elastomer sections 56 and 58 between which is situated annular air gap 60.

Similarly, outer cylindrical vibration attenuator cartridge 62 has two concentric/coaxial metallic rings, viz., outer cartridge inner metal ring 64 and outer cartridge outer metal ring 66, which sandwich an outer cartridge circumferentially tri-columnar layer configuration 68 having a pair of lateral high damping elastomer sections 70 and 72 between which is situated annular air gap 74.

More specifically, inner cartridge inner metal ring 50 has inner cartridge inner metal ring inner surface 76 and inner cartridge inner metal ring outer surface 78. Inner cartridge inner metal ring inner surface 76 abuts shaft 20, and inner cartridge inner metal ring outer surface 78 abuts inner cartridge circumferentially tri-columnar layer configuration 54. Inner cartridge outer metal ring 52 has inner cartridge outer metal ring inner surface 80 and inner cartridge outer metal ring outer surface 82. Inner cartridge outer metal ring inner surface 80 abuts inner cartridge circumferentially tri-columnar layer configuration 54, and inner cartridge outer metal ring outer surface 82 abuts inner ring nonracewayed surface 28.

Similarly, outer cartridge inner metal ring 64 has outer cartridge inner metal ring inner surface 84 and outer cartridge inner metal ring outer surface 86. Outer cartridge inner metal ring inner surface 84 abuts outer ring nonracewayed surface 38, and outer cartridge inner metal ring outer surface 86 abuts outer cartridge circumferentially tri-columnar layer configuration 68. Outer cartridge outer metal ring 66 has outer cartridge outer metal ring inner surface 88 and outer cartridge outer metal ring outer surface 90. Outer cartridge outer metal ring inner surface 88 abuts outer cartridge circumferentially tri-columnar layer configuration 68, and outer cartridge outer metal ring outer surface 82 abuts bearing housing 22.

Cartridges 48 and 62 are complementary in size and shape, especially axially longitudinally and diametrically, in relation to standard roller bearing 12, shaft 20 and bearing housing 22. Inner cartridge 48 suitably fits between shaft 20 and inner bearing ring 16, and outer cartridge 62 suitably fits between housing 22 and outer bearing ring 18. Inner cartridge inner metal ring inner surface 76 is consonant with the outer surface of shaft 20. Inner cartridge outer metal ring outer surface 82 is consonant with inner ring nonracewayed surface 28. Outer cartridge inner metal ring inner surface 84 is consonant with outer ring nonracewayed surface 38. Outer cartridge outer metal ring outer surface 90 is consonant with bearing housing 22.

Inner cartridge 48 and outer cartridge 62 are, in a sense, utilized as bushings which line inner ring nonracewayed surface 28 and outer ring nonracewayed surface 38, respectively, so as to effectuate reduction of vibration transmission. Annular air gaps 60 and 74 are each strategically placed for breaking the noise path which originates from rotating shaft 20. In addition, elastomer sections 70 and 72 afford viscoelastic damping while maintaining adequate stiffness. As shaft 20 rotates, vibration generated by the engagement of rolling elements 14 with inner ring 16 (along inner ring raceway 36) and with outer ring 18 (along outer ring raceway 46) is thus attenuated by inner cartridge 48 and outer cartridge 62.

Inner cartridge 48 and outer cartridge 62 are each inexpensively fabricated prior to installation in the electric motor. Each cartridge is a unit which is made by injecting and curing, in the space between the metallic outer cartridge ring and the metallic inner cartridge ring, high damping elastomeric material along each of two separated axially lateral circumferential tracks, thereby introducing in the space the axially interposed circumferential hiatus.

Cartridges 48 and 62 represent new hardware which can each be made an integral and permanent part of an existing motor. Standard roller bearing 12 can be replaced, as necessary, without damaging cartridges 48 and 62. According to the present invention, cartridges such as cartridges 48 and 62 are preferably designed to maintain concentricity, stiffness and motor tolerances.

High damping elastomeric annular disk 92 is attached to metallic annular backing plate 93. The combination of elastomeric annular disk 92 and backing plate 93 is positioned between inner ring side surface 32 and shaft shoulder 23, whereby elastomeric annular disk 92 is approximately coextensive, in the radial direction, with inner ring 16.

High damping elastomeric annular disk 94 is attached to metallic backing plate 95. The combination of elastomeric annular disk 94 and backing plate 95 is positioned between inner ring side surface 34 and bearing locknut 24, whereby elastomeric annular disk is also approximately coextensive, in the radial direction, with inner ring 16.

High damping elastomeric annular disk 96 is attached to metallic backing plate 97. The combination of elastomeric annular disk 96 and backing plate 97 is positioned between outer ring side surface 42 and the combination of bearing end cap 27 and preload spring 29, whereby elastomeric annular disk 96 is approximately coextensive, in the radial direction, with the combination of outer ring 18 and outer cartridge 62.

Accordingly, in this example the present invention features vibration attenuation of roller bearing 12 by the following means, at the following locations: by means of inner cylindrical cartridge 48, located at the interface of inner ring nonracewayed surface 28 and the shaft 20 outer surface; by means of outer cylindrical cartridge 62, located at the interface of outer ring nonracewayed surface 38 and the bearing housing 22 inner surface; by means of elastomeric annular disk 92 together with metallic annular backing plate 93, located at the interface between inner ring side surface 32 and shaft shoulder 23; by means of elastomeric annular disk 94 together with metallic annular backing plate 95, located at the interface between inner ring side surface 34 and bearing locknut 24; and, by means of elastomeric annular disk 96 together with metallic annular backing plate 97, located at the interface between outer ring side surface 42 and bearing end cap 27 together with preload spring 29.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. For utilization in combination with a roller bearing of the type having a radially inner ring, a radially outer ring and a plurality of rolling elements therebetween, said radially inner ring and said radially outer ring being in concentric arrangement, said radially inner ring having a radially outwardly facing racewayed circumferential surface and a radially inwardly facing nonracewayed circumferential surface, said radially outer ring having a radially inwardly facing racewayed circumferential surface and a radially outwardly facing nonracewayed circumferential surface, said radially inner ring being securable with respect to a rotating non-bearing structure, said radially outer ring being securable with respect to a fixed non-bearing structure; a cylindrical member for concentric interposition at an interface of a said nonracewayed circumferential surface and a said non-bearing structure, said cylindrical member comprising:

a radially inner continuous circumferential stratums;

a radially outer continuous circumferential stratum; and a radially intermediate discontinuous circumferential stratum which couples said radially inner continuous circumferential stratum and said radially outer continuous circumferential stratum;

said radially intermediate discontinuous circumferential stratum including a first axially lateral elastomeric circumferential segment, a second axially lateral elastomeric circumferential segment and an axially medial circumferential hiatus therebetween;

said-first elastomeric circumferential segment having a radially inwardly facing first elastomeric periphery and a radially outwardly facing first elastomeric periphery;

said second elastomeric circumferential segment having a radially inwardly facing second elastomeric periphery and a radially outwardly facing second elastomeric periphery;

said first elastomeric circumferential segment extending solidly between said radially inwardly facing first elastomeric periphery and said radially outwardly facing first elastomeric periphery;

said second elastomeric circumferential segment extending solidly between said radially inwardly facing second elastomeric periphery and said radially outwardly facing second elastomeric periphery;

said radially inwardly facing first elastomeric periphery and said radially inwardly facing second elastomeric periphery each abutting said radially inner continuous circumferential stratum;

said radially outwardly facing first elastomeric periphery and said radially outwardly facing second elastomeric periphery each abutting said radially outer continuous circumferential stratum;

said cylindrical member being sufficiently rigid for maintaining concentricity and tolerance which are suitable for said concentric interposition;

whereby, during said utilization, said cylindrical member attenuates vibration which is transmitted by said roller bearing, said attenuating including damping and noise diminution, said damping being effected by said first elastomeric circumferential segment and said second elastomeric circumferential segment, said noise diminution being effected by said circumferential hiatus.

2. A cylindrical member as in claim 1, wherein said radially inner continuous circumferential stratum is metallic.

3. A cylindrical member as in claim 1, wherein said radially outer continuous circumferential stratum is metallic.

4. A cylindrical member as in claim 1, wherein said radially inner continuous circumferential stratum and said radially outer continuous circumferential stratum are each metallic.

5. A cylindrical member as in claim 1, wherein, during said utilization:

said rolling elements are movable in a circumferential course defined by a radially opposing pair of raceways, said circumferential course having an axially taken course width;

said circumferential hiatus is in approximate radial alignment with said course;

said circumferential hiatus has an axially taken hiatus width; and said hiatus width is greater than said course width.

6. An improved roller bearing assembly, said roller bearing assembly being of the type wherein a plurality of rolling elements rollingly contact two coaxial rings, the inner said ring being used for securing with respect to a rotating non-bearing object, the outer said ring being used for securing with respect to a fixed non-bearing object, wherein the improvement comprises at least one cylindrical cartridge which is coaxially positioned, radially interpositionally, between a said ring and a said non-bearing object, each said cylindrical cartridge comprising a radially inner circumferential layer, a radially outer circumferential layer and a core circumferential layer, said core circumferential layer including:

a first axially extreme elastomeric section and a second axially extreme elastomeric section, said first and second axially extreme elastomeric sections being separated by an axially intermediate gap;

said first axially extreme elastomeric section having an axially inner first elastomeric side and an axially outer first elastomeric side;

said second axially extreme elastomeric section having an axially inner second elastomeric side and an axially outer second elastomeric side;

said first axially extreme elastomeric section filling the space bounded by said axially inner first elastomeric side, said axially outer first elastomeric side, said radially inner circumferential layer and said radially outer circumferential layer;

said second axially extreme elastomeric section filling the space bounded by said axially inner second elastomeric side, said axially outer second elastomeric side, said radially inner circumferential layer and said radially outer circumferential layer;

said first and second axial extreme elastomeric sections thereby joining said radially inner circumferential layer and said radially outer circumferential layer so that said cylindrical cartridge is adequately stiff, in terms of maintaining shape and dimension, for said being positioned between said ring and said non-bearing object;

said cylindrical cartridge affording attenuation of vibration which is generated when said rolling elements rollingly contact said two coaxial rings, said attenuation including damping by said first and second axial extreme elastomeric sections and noise reduction by said axially intermediate gap.

7. An improved roller bearing assembly as in claim 6, wherein a said cylindrical cartridge is coaxially positioned between said inner ring and said rotating non-bearing member.

8. An improved roller bearing assembly as in claim 6, wherein a said cylindrical cartridge is coaxially positioned between said outer ring and said fixed non-bearing member.

9. An improved roller bearing assembly as in claim 6, wherein a said cylindrical cartridge is coaxially positioned between said inner ring and said rotating non-bearing member, and wherein a said cylindrical cartridge is coaxially positioned between said outer ring and said fixed non-bearing member.

10. An improved roller bearing assembly as in claim 6, wherein, for at least one said cylindrical cartridge, said radially inner circumferential layer is metallic.

11. An improved roller bearing assembly as in claim 6, wherein, for at least one said cylindrical cartridge, said radially outer circumferential layer is metallic.

12. An improved roller bearing assembly as in claim6, wherein, for at least one said cylindrical cartridge, said radially inner circumferential layer and said radially outer circumferential layer are each metallic.

13. An improved roller bearing assembly as in claim 6, further comprising at least one elastomeric annular disk which is coaxially positioned, axially interpositionally, between a said ring and a said non-bearing object.

14. An improved roller bearing assembly as in claim 13, further comprising at least one non-elastomeric annular plate, each said non-elastomeric annular plate being joined with a said elastomeric annular disk.

15. An improved roller bearing assembly as in claim 14 wherein at least one said non-elastomeric annular plate is metallic.

16. Method for reducing vibration generated by a roller bearing, said roller bearing being of the type having an inner coaxial ring, an outer coaxial ring and a plurality of rolling elements which rollingly contact said inner coaxial ring and said outer coaxial ring, said method comprising:

(a) providing a pair of first hollow cylinders having unequal diameters;

(b) coaxially uniting said first hollow cylinders so as to form a first hollow cylindrical unit;

said uniting including introducing and curing a first high damping elastomeric material between said coaxially situated first hollow cylinders so as to provide a first left circumferential elastomeric damping band and a first right circumferential elastomeric damping band, and so as to leave a first medial circumferential gap between said first left circumferential elastomeric damping band and said first right circumferential elastomeric damping band;

said first left circumferential elastomeric band having a first left elastomeric axial width;

said first right circumferential elastomeric band having a first right elastomeric axial width;

said first left-circumferential elastomeric damping band having a first left-interior elastomeric side and a first left exterior elastomeric side which delimit said first left elastomeric axial width;

said first right circumferential elastomeric damping band having a first right interior elastomeric side and a first right exterior elastomeric side which delimit said first right elastomeric axial width;

said first left circumferential elastomeric damping band abutting each said first hollow cylinder;

said first right-circumferential elastomeric damping band abutting each said first hollow cylinder;

said first medial circumferential gap having a first gap axial width;

said first left interior elastomic side and said first right interior elastomeric side delimiting said first gap axial width;

whereby, in anticipation of said first hollow cylindrical unit being coaxially fitted inside said inner coaxial ring, said first hollow cylindrical unit is characterized by requisite stiffness for maintaining coaxiality and tolerance, and said first medial circumferential gap is disposed to effectuate noise abatement;

(c) coaxially fitting inside said inner coaxial ring said first hollow cylindrical unit;

(d) providing a pair of second hollow cylinders having unequal diameters;

(e) coaxially uniting said second hollow cylinders so as to form a first hollow cylindrical unit:

said uniting including introducing and curing a second high damping elastomeric material between said coaxially situated second hollow cylinders so as to provide a second left circumferential elastomeric damping band and a second right circumferential elastomeric damping band, and so as to leave a second medial circumferential gap between said second left circumferential elastomeric damping band and said second right circumferential elastomeric damping band;

said second left circumferential elastomeric damping band having a second left elastomeric axial width:

said second right circumferential elastomeric damping band having a second right elastomeric axial width;

said second left circumferential elastomeric damping band having a second left interior elastomeric side and a second left exterior elastomeric side which delimit said second-left elastomeric axial width;

said second right circumferential elastomeric damping band having a second-right interior elastomeric side and a second right exterior elastomeric side which delimit said second right elastomeric axial width;

said second left circumferential elastomeric damping band abutting each said second hollow-cylinder;

said second right circumferential elastomeric damping band abutting each said second-hollow cylinder;

said second medial circumferential gap having a second gap axial width;

said second left interior elastomic side and said second right interior elastomeric side delimiting said second gap axial is width;

whereby, in anticipation of said second hollow cylindrical unit being coaxially fitted outside said outer coaxial ring said second hollow cylindrical unit is characterized by requisite stiffness for maintaining coaxiality and tolerance, said second left circumferential band and said second right circumferential band are disposed to effectuate damping, and said second medial circumferential gap is disposed to effectuate noise abatement; and (f) coaxially fitting outside said outer coaxial ring said second hollow cylindrical unit.

17. Method for reducing vibration generated by a roller bearing as in claim 16, wherein said first hollow cylinders are made of metal.

18. Method for reducing vibration generated by a roller bearing as in claim 16, wherein said second hollow cylinders are made of metal.

19. Method for reducing vibration generated by a roller bearing as in claim 16; wherein said first hollow cylinders and said second hollow cylinders are made of metal.

20. Method for reducing vibration generated by a roller bearing as in claim 16, wherein:

said rolling elements rollingly contact said inner coaxial ring and said outer coaxial ring so as to travel a circumferential track having a track axial width;

in step (b), in anticipation of said first hollow cylindrical unit being coaxially fitted inside said inner coaxial ring, said first gap axial width exceeds said track axial width, and said first medial circumferential gap is disposed so as to be approximately even with said circumferential track in the radial direction;

in step (e), in anticipation of said second hollow cylindrical unit being coaxially fitted outside said outer coaxial ring, said second gap axial width exceeds said track axial width, and said second medial circumferential gap is disposed so as to be approximately even with said circumferential track in the radial direction.

* * * * *